(12) United States Patent
Nozik

(10) Patent No.: US 6,346,567 B1
(45) Date of Patent: Feb. 12, 2002

(54) NATURAL RUBBER ELASTOMERIC MOUNTS

(75) Inventor: Zina Nozik, Stratford (CA)

(73) Assignee: Cooper-Standard Automotive Inc., Findlay, OH (US)

( * ) Notice: Subject to any disclaimer, the term of this patent is extended or adjusted under 35 U.S.C. 154(b) by 1407 days.

(21) Appl. No.: 08/644,622

(22) Filed: May 6, 1996

Related U.S. Application Data

(63) Continuation of application No. 08/265,319, filed on Jun. 24, 1994, now abandoned.

(51) Int. Cl.[7] ................................................. C08K 3/00
(52) U.S. Cl. .......................... 524/495; 524/92; 524/246; 524/496; 524/575.5
(58) Field of Search .......................... 524/92, 246, 495, 524/496, 575.5

(56) References Cited

U.S. PATENT DOCUMENTS

| | | | | |
|---|---|---|---|---|
| 4,021,404 A | * | 5/1977 | Cox | 260/42.32 |
| 4,405,758 A | * | 9/1983 | Jablonski | 525/329.8 |
| 4,489,921 A | | 12/1984 | Martin | 267/141.5 |
| 4,770,398 A | | 9/1988 | Lee | 267/293 |
| 4,983,685 A | * | 1/1991 | Aoshima et al. | 525/331.8 |
| 5,120,779 A | * | 6/1992 | Cornell et al. | 524/100 |
| 5,159,009 A | * | 10/1992 | Wolff et al. | 524/495 |

* cited by examiner

Primary Examiner—Edward J. Cain
(74) Attorney, Agent, or Firm—Fay, Sharpe, Fagan, Minnich & McKee, LLP

(57) ABSTRACT

Resilient elastomeric mounts and in particular, natural rubber engine mounts, which maintain good mechanical and dynamic properties at temperatures in excess of 250° F., are provided. The natural rubber engine mounts of the present invention are thus ideal for use in underhood applications which require durability at high temperatures, i.e. from about 250° F. to about 280° F. The mounts generally comprise rubber produced by an efficient vulcanization (EV) system, which employs a curing system having a sulfur accelerator and sulfur donor. In a preferred composition, the accelerator is a sulfonamide and thiazole present at a level of about 1.2 phr to about 1.8 phr, and the sulfur donor is tetramethyl thuiram disulfide present at a level of about 0.1 phr to about 0.4 phr.

14 Claims, 3 Drawing Sheets

NATURAL RUBBER ELASTOMERIC MOUNTS

This is a continuation of U.S. patent application Ser. No. 08/265,319 filed Jun. 24, 1994 now abandoned.

FIELD OF THE INVENTION

The present invention relates generally to resilient elastomeric mounts with improved durability and, more particularly, to a natural rubber engine mount which is capable of long term performance at temperatures in excess of 250° F.

BACKGROUND OF THE INVENTION

Internal combustion engines and other types of vehicle power plants produce various forms of vibrations which may be undesirably transmitted to the vehicle frame. These vibrations may be high or low in amplitude and high or low in frequency. Elastomeric materials and in particular natural rubber, have been used in underhood applications. Natural rubber is a preferred elastomeric material in such applications due to its excellent mechanical properties and flex fatigue life. However, increases in underhood temperatures due to small crowded engine compartments, have led to increased temperature standards for underhood elastomeric materials. For example, whereas resilient elastomeric parts such as engine mounts and bushings were previously required to meet a temperature requirement of 200° F., the same parts must meet temperature requirements of 250° F. to 300° F. Unfortunately, conventional natural rubber used in natural rubber mounts approaches its limit of resistance to oxidative degradation at temperatures over 200° F.

The oxidation of rubber is a complicated process, involving several reactions, each of which is influenced differently by conditions. The actual degradation process occurrs during the service life of rubber products can be separated into thermal, oxidative and photochemical factors. Thermal breakdown of natural rubber involves cleavage of long chain molecules resulting in the formation of very reactive radicals. The degradation reactions are chain mechanisms in which the activated intermediates are radicals. The changes in physical properties are the sum of simultaneous processes of crosslinking, cyclization, continued polymerization and scission.

It would thus be desirable to provide resilient elastomeric mounts which are durable at temperatures in excess of 250° F. It would also be desirable to provide resilient elastomeric mounts such as engine mounts which are made of natural rubber and are durable at temperatures in excess of 250° F.

SUMMARY OF THE INVENTION

Resilient elastomeric mounts and, in particular, natural rubber engine mounts, which maintain good mechanical and dynamic properties at temperatures in excess of 250° F., are provided. The natural rubber engine mounts of the present invention are thus ideal for use in underhood applications which require durability at high temperatures, i.e. from about 250° F. to about 280° F.

The resilient elastomeric mounts of the present invention comprise natural rubber produced by an "efficient vulcanization" (EV) system. Sulfur vulcanization is the most widely used method for cross linking natural rubber. The amount of sulfur used in the natural rubber compounds varies from about 3.5 phr to about 0.4 phr. When the amount of the sulfur is reduced, an optimum crosslink density is maintained by increasing the accelerator concentration. In an EV system, the natural rubber contains a high accelerator:sulfur ratio. In general, the accelerator:sulfur ratio is about 2.5 phr to 1.2 phr. The high accelerator:sulfur ratio leads to a natural rubber containing a majority of monosulfidic crosslinks which are more heat stable than polysulfidic crosslinks found in conventional rubber. In addition, with conventional rubber, the main-chain modification and potential for oxidation is greater, even in the presence of antioxidants.

The natural EV rubber used in the mounts of the present invention comprise a curing system having a sulfur donor and accelerator, wherein the amount of sulfur donor is about 0.1 phr to about 0.4 phr and the amount of accelerator is about 1.0 phr to about 1.8 phr. The natural EV rubber of the present invention further comprises antidegredants such as antioxidants. In addition, additives such as fillers may be used to meet dynamic requirements. The engine mounts of the present invention may be manufactured using the natural EV rubber described herein, using methods known to those skilled in the art.

Those skilled in the art will appreciate that the exact compositon of the natural EV rubber of the present invention may be varied according to the desired characteristics of the resulting rubber. Moreover, it will be appreciated by those skilled in the art that various compounding changes and modifications may be made to meet various dynamic requirements for the resulting mounts, including but not limited to, static or dynamic spring rate, dampening coefficient and loss tangent. Furthermore, it will be appreciated that the present invention is not limited to resilient elastomeric mounts, but includes vibration isolation apparatus generally, made from the natural EV rubber described herein.

Additional objects, advantages, and features of the present invention will become apparent from the following description and appended claims.

BRIEF DESCRIPTION OF THE DRAWINGS

The various advantages of the present invention will become apparent to one skilled in the art by reading the following specification and subjoined claims and by referencing the following drawings in which:

DETAILED DESCRIPTION OF THE PREFERRED EMBODIMENTS

Figure 1:
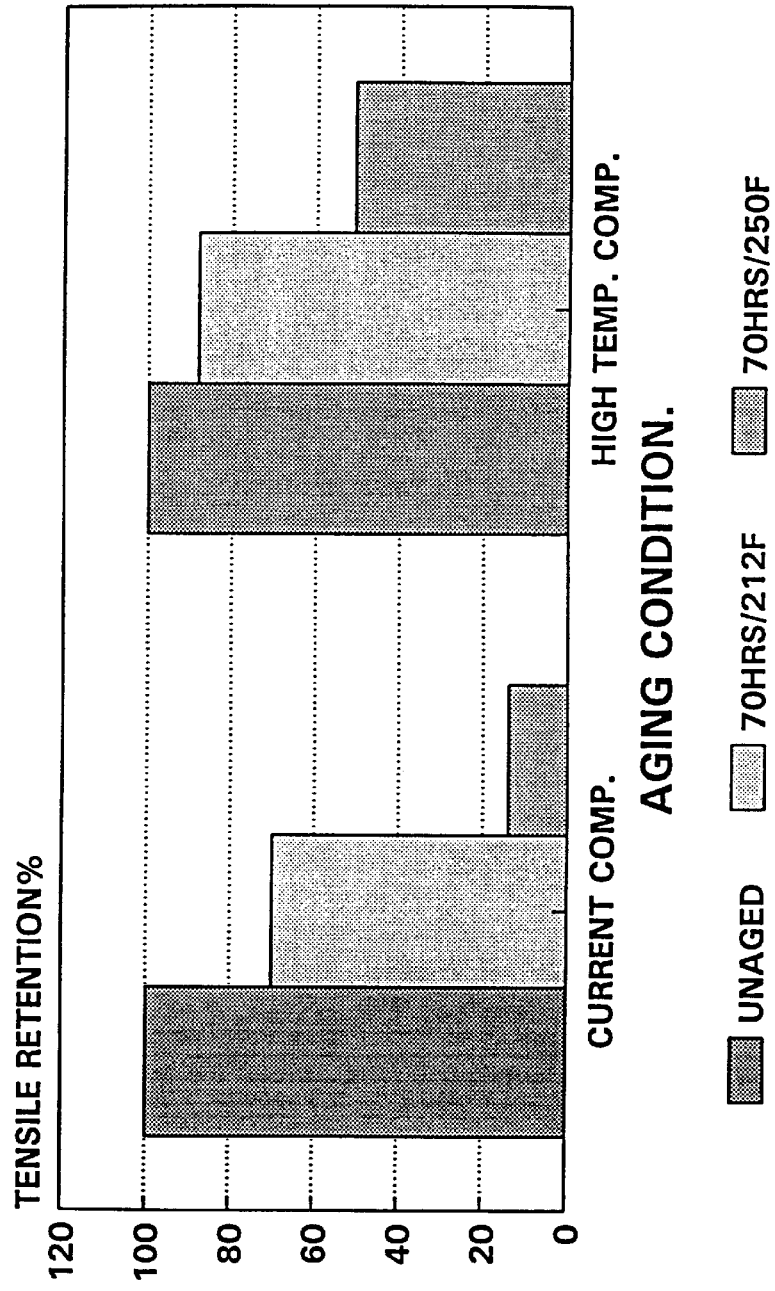
FIG. 1 is a chart showing the heat/age effect on tensile strength.

The resilient elastomeric mounts of the present invention generally comprise rubber produced by an efficient vulcanization (EV) system. In producing the natural EV rubber of the present invention, a curing system is employed having a sulfur accelerator and sulfur donor. In a preferred composition, the accelerator is a sulfonamide and thiazoles, present at a level of about 1.2 phr to about 1.8 phr, and the sulfur donor is tetramethyl thuiram disulfide present at a level of about 0.1 phr to about 0.4 phr.

The effect of degradation and in particular oxidation, on the mounts of the present invention, has been studied. In particular, the oxidative effect on exposure to elevated temperatures and on the performance of the mounts of the present invention has been evaluated. It has been found that antidegradants such as N-phenyl-N'-(1,3 dimethyl butyl)-p-phenylenediamine or other blends of p-phenylene diamines are effective and in particular, these antidegradants reduced the rate of crack growth under static and dynamic conditions. The mercaptobenzimidozole and its zinc salts derivatives in combination with amine antioxidants showed excellent improvement in heat resistance and flex fatigue life. The preferred level of diamines is from about 2 phr to about 4 phr and the preferred level of zinc salt derivatives is from about 1 phr to about 3 phr.

Other factors were considered in preparing the natural EV rubber for the engine mounts of the present invention, such as the effect of filler particle size to obtain the lowest stress-relaxation rates. It was found that the lowest rates were obtained with the large-particle size blacks: carbon MT and carbon SRF. The dispersion and durabilty tests conducted on the mounts of the present invention showed that these types of carbons are best suited for engine mounts. In particular large-particle carbon black as carbon N990 and carbon N550 at a level of from about 15 phr to about 40 phr, is preferably added to meet requirements of static and dynamic spring rates, dampening coefficient and loss tangent.

Table 1 compares the general formula for conventional natural rubber and for the natural EV rubber of the present invention:

TABLE 1

| Compound | Conventional (phr) | EV (phr) |
| --- | --- | --- |
| Natural Rubber | 100 | 100 |
| Stearic Acid | 1 | 1 |
| Zinc Oxide | 5 | 5 |
| HAF Black (N330) | 21 | — |
| FEF Black (N550) | — | 10–40 |
| SRF Black (N774) | 21 | 10–40 |
| Naphtenic Oil | 12 | 12 |
| Dioctylated Diphenylamines | 1.5 | — |
| N-Isopropyl-N-Phenyl-P-Phenylene Diamine | 2 | – |
| Zinc 2-Mercaptotoluimidazole | — | 1—3 |
| Diphenylamine-Acetone Reaction Product | — | 2-4 |
| Sulfur | 2.3 | 0.6–1.2 |
| Tetramethyl Thuiram Disulfide | — | 0.1–0.4 |
| Morpholinodithio-Benzothiozole | — | 1.0–1.5 |
| Benzothiazoie Sulfurnamide | 1.2 | 0.3–1.0 |

It has been shown that the natural EV rubber compound used in the mounts of the present invention is durable at temperatures in excess of 250° F. More specifically, the natural EV compounds have improved reversion resistance resulting in uniform properties at elevated temperatures as high as 280° F. In addition, compound flexibilities are available and can be developed to match the majority of requirements in any vibration isolators and maintain stability of dynamic characteristics after exposure to high temperatures. The mounts of the present invention meet unaged durability requirements, high temperature durability requirements when the operating temperatures have risen to 250° F.–280° F., and low temperature durability requirements. The static spring rate requirements for the mounts can also be met by a durometer change from 40 shore hardness to 70 shore hardness.

The following specific examples further describe the mounts of the present invention.

SPECIFIC EXAMPLE 1

Testing of the mechanical properties of the natural EV rubber of the present invention was carried out according to the following ASTM procedures, herein incorporated by reference: ASTM D395 (compression set), ASTM D412 (stress/strain (tensile)), ASTM D624 (tear, die C), ASTM D813 (de-mattia flex), ASTM D2240 (durometer) and ASTM D573 (heat aging, oven aging).

Figure 2:
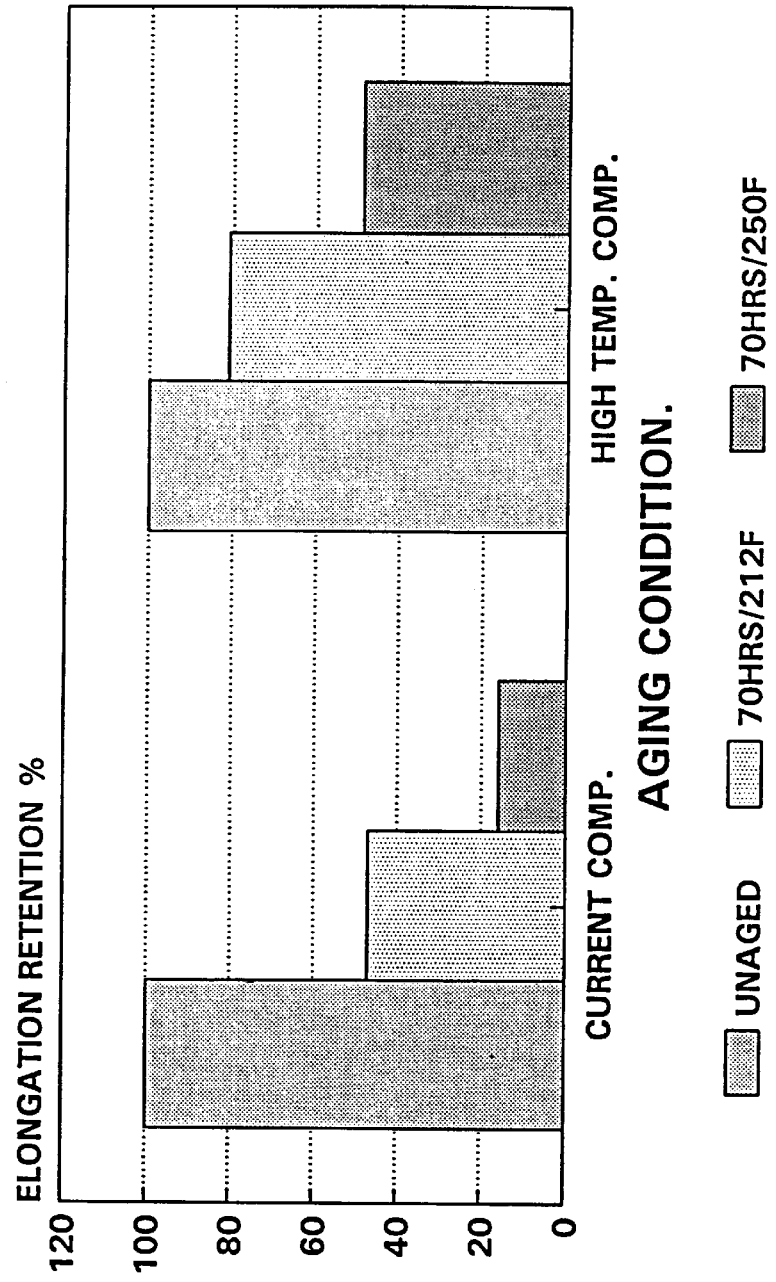
FIG. 2 is a chart showing the heat/age effect on elongation.

Heat resistance of the natural EV rubber of the present invention was compared to heat resistance of conventional natural rubber compounds. In particular, the heat resistance of the compounds were tested at test temperatures of 212° F. and 250° F. and compounds were aged for 70 hrs, and compared to unaged rubber compounds. As Table 2 and FIGS. 1 and 2 show, the rubber of the present invention shows great improvement in retention of tensile and elongation. In the Figures, "Current Comp." referes to the conventional rubber compound and "High Tem. Comp." refers to the natural EV rubber compound of the present invention.

TABLE 2

| | | Conventional Rubber | EV Rubber |
| --- | --- | --- | --- |
| Tensile, PSI | Original | 3505 | 3489 |
| Tensile, PSI | 70 hrs/212° F. | 2486 | 3071 |
| Tensile, PSI | 70 hrs/250° F. | 491 | 1779 |
| Elongation % | Original | 559 | 575 |
| Elongation % | 70 hrs/212° F. | 257 | 490 |
| Elongation % | 70 hrs/250° F. | 101 | 296 |

It is thus clear that the natural EV rubber has good heat resistance. In addition, the greater reversion resistance of the natural EV rubber or flat curing characteristics, help to maintain better consistency in a component being mass-produced.

SPECIFIC EXAMPLE 2

Figure 3:
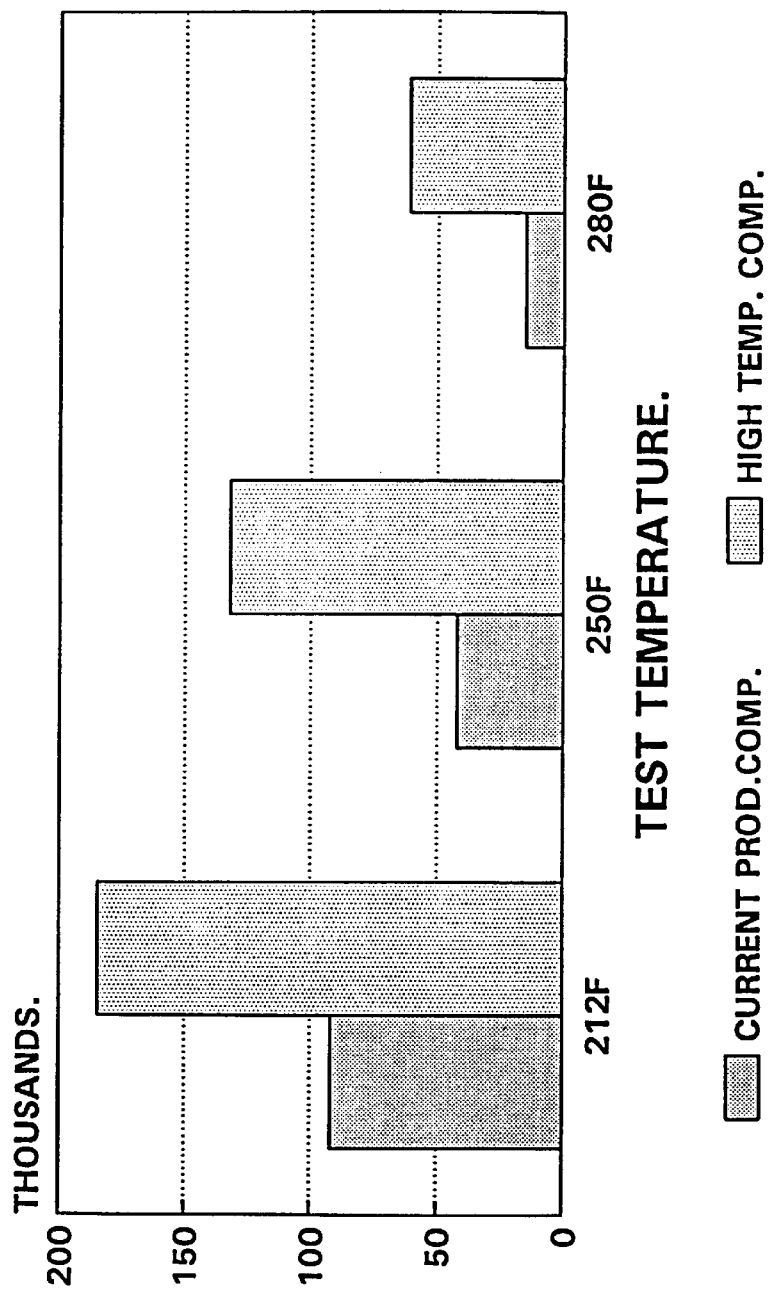
FIG. 3 is a chart showing the effect of temperature on durability of engine mounts.

From the data of heat aging, the implication was made that larger changes in original properties after heat aging should produce early failure in durability tests in the heat aged engine mounts and small changes will result in little change in durability life. In an effort to evaluate this assumption, the compounds were durability tested at temperatures of 212° F., 250° F. and 280° F. The dynamic properties were obtained using the MTS 830 elastomer test system and the durability tests were run on MTS 810 (both of which are herein incorporated by reference). The applied force was in 45 degree orientation. The conditions for the fatigue testing where maxium compression of 5560 N and maxium tension of 2680 N. Fatigue tests were run simultaneously on the EV rubber compound of the present invention and the conventional natural rubber compounds, from ambient temperature to 250° F. Before each part was tested, the original dynamic properties were measured for comparison. The static and dynamic spring rate, damping coefficient and loss tangent of the natural EV rubber engine mounts were matched to conventional natural rubber engine mounts. As shown in FIG. 3, the natural EV rubber engine mounts showed 3 to 4 times improvement over conventional rubber parts at 250° F. and 280° F. The durability life doubled at 212° F. At ambient temperatures, (data not shown) the durability results were comparable for both types of rubber mounts.

The foregoing discussion discloses and describes merely exemplary embodiments of the present invention. One skilled in the art will readily recognize from such discussion, and from the accompanying drawings and claims, that various changes, modifications and variations can be made therein without departing from the spirit and scope of the invention as defined in the following claims.

We claim:

1. A resilient elastomeric mount comprising natural rubber produced by an efficient vulcanization system having a curing system comprising an accelerator component at a level of about 1.2 phr to about 1.8 phr and a sulfur donor component at a level of about 0.1 phr to about 0.4 phr, wherein the natural rubber further comprises antidegradants including an antioxidant comprising a blend of p-phenylene diamine in combination with zinc salt derivatives of mercaptobenzimidazole, wherein said natural rubber has a majority of monosulfidic crosslinks and wherein the mount has stable dynamic properties after exposure to a temperature of 250° F. for 70 hours, when tested using the MTS 830 elastomer test system.

2. The resilient elastomeric mount of claim 1, wherein the mount is an engine mount.

3. The resilient elastomeric mount of claim 1, wherein the rubber further comprises filler of large-particle size black carbon.

4. The resilient elastomeric mount of claim 1, wherein the accelerator comprises a sulfonamide and thiozole.

5. The resilient elastomeric mount of claim 1, wherein the sulfur donor is tetramethyl thiuram disulfide.

6. The resilient elastomeric mount of claim 3, wherein the large-particle size black carbon is selected from the group consisting of carbon N990, carbon N550 and combinations thereof.

7. The resilient elastomeric mount of claim 6, wherein the p-phenylene diamines are present at a level of about 2 phr to about 4 phr.

8. The resilient elastomeric mount of claim 1, wherein the compound is a zinc salt derivative of mercaptobenzimidazole and is present at a level of about 2 phr to about 4 phr.

9. The resilient elastomeric mount of claim 6, wherein the amount of carbon N990, carbon N550 and combinations thereof is present at a level of about 15 phr to about 40 phr.

10. A resilient elastomeric mount comprising natural rubber produced by an efficient vulcanization system having a curing system comprising an accelerator including sulfonamide and thiazole at a level of about 1.2 phr to about 1.8 phr and a sulfur donor including tetramethyl thuiram disulfide at a level of about 0.1 phr to about 0.4 phr, wherein the natural rubber further comprises an antioxidant comprising a blend of p-phenylene diamine in combination with zinc salt derivatives of mercaptobenzimidazole, and has a majority of monosulfidic crosslinks, and wherein the mount has stable dynamic properties after exposure to a temperature of 250° F. for 70 hours, when tested using the MTS 830 elastomer test system.

11. The resilient elastomeric mount of claim 10, wherein the antioxidant is a blend of p-phenylene diamines in combination with a compound selected from the group consisting of mercaptobenzimidazoles, zinc salt derivatives and combinations thereof.

12. The resilient elastomeric mount of claim 10, wherein the rubber further comprises filler of large-particle size black carbon.

13. The resilient elastomeric mount of claim 10, wherein the mount is an engine mount.

14. The resilient elastomeric mount of claim 12, wherein the large-particle size black carbon is selected from the group consisting of carbon N990, carbon N550 and combinations thereof.

* * * * *